(12) United States Patent
Tung

(10) Patent No.: US 6,275,149 B1
(45) Date of Patent: *Aug. 14, 2001

(54) ILLUMINANT TRIANGULAR WARNING ARRANGEMENT

(76) Inventor: Rong-Fang Tung, No. 9, Lane 39, Houshing N. Rd., Gangshan Jen (TW), 820

( * ) Notice: Subject to any disclaimer, the term of this patent is extended or adjusted under 35 U.S.C. 154(b) by 0 days.

This patent is subject to a terminal disclaimer.

(21) Appl. No.: 09/513,892

(22) Filed: Feb. 28, 2000

(30) Foreign Application Priority Data

Oct. 14, 1999 (TW) ................................................ 088217577

(51) Int. Cl.[7] .................................................... B60Q 7/00
(52) U.S. Cl. ........................ 340/473; 340/471; 340/472; 340/468; 340/908; 340/908.1
(58) Field of Search ............................. 340/114 R, 114 B, 340/107, 473; 362/241, 310, 237, 397, 398

(56) References Cited

U.S. PATENT DOCUMENTS 3,766,881 * 10/1973 Ward .................................. 116/63 P
3,934,541 * 1/1976 May et al. .......................... 116/63 T
4,613,847 * 9/1986 Scolari et al. .................... 340/114 R
5,606,309 * 2/1997 Smith ................................... 340/473
6,027,227 * 2/2000 Tung ................................... 362/241

* cited by examiner

Primary Examiner—Jeffery Hofsass
Assistant Examiner—Hung Nguyen
(74) Attorney, Agent, or Firm—Raymond Y. Chan; David and Raymond Patent Group

(57) ABSTRACT

An illuminant triangular warning arrangement includes a clothe body and a plurality of illuminating units provided on the clothe body. Each illuminating unit provides a transparent layer, a circuit board, a casing socket, a fitting washer, a photodiode (LED), a battery box, and a manual switch. With the combination of the above elements, the illuminant triangular warning arrangement is in used, its displaying area is large enough to catch other drivers attention from far away. When the illuminant triangular warning arrangement is not in used, it can be folded into a compact package, so that it would not occupy unnecessary space in the trunk of the vehicle for easy storage.

6 Claims, 5 Drawing Sheets

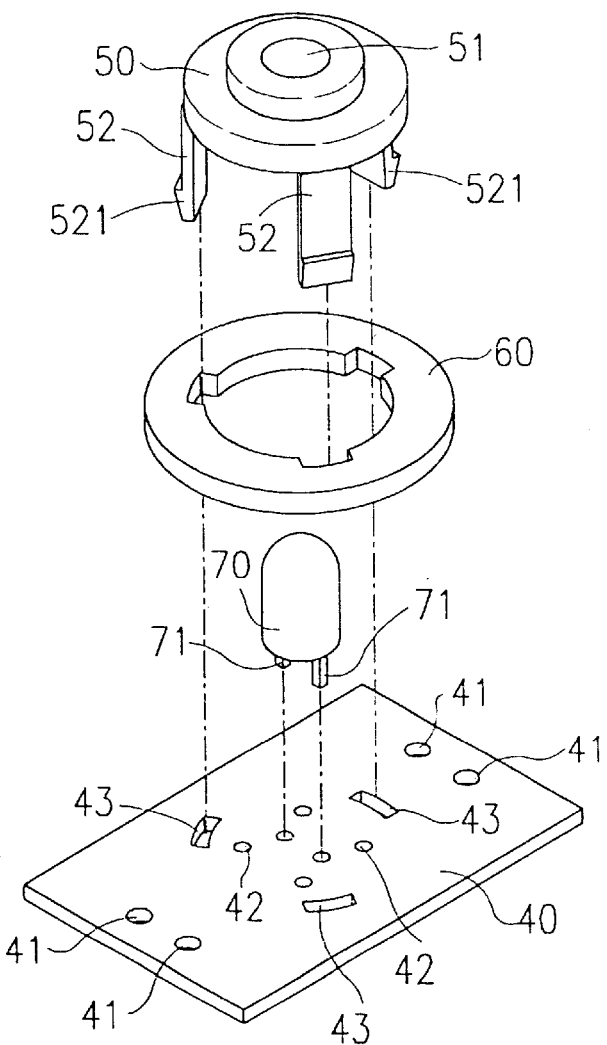
Fig.5-A
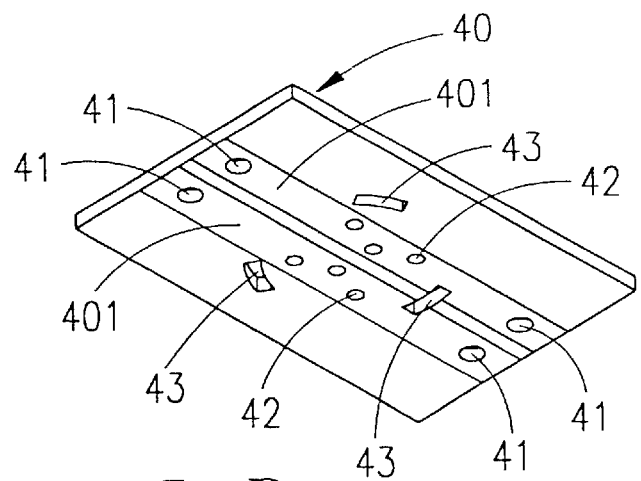
Fig.5-B

ILLUMINANT TRIANGULAR WARNING ARRANGEMENT

FIELD OF THE PRESENT INVENTION

The present invention relates to a safety warning arrangement, and more particularly to an illuminant triangular warning arrangement having an illuminating device equipped with a light reflector device to provide alert warning for other vehicles on the road, especially during night time or poor weather conditions, so as to avoid an accident.

BACKGROUND OF THE PRESENT INVENTION

Normally when a vehicle breaks down or has trouble on the road, the driver can place a conventional triangular light reflecting warning sign behind the troubled vehicle for alert warning. The conventional light reflecting triangular warning sign work fine during daytime or high visibility hours. However, when the weather is rainy or foggy, with low visibility other drivers may fail to observe the warning sign and crash into the troubled vehicle.

The conventional light reflecting triangular warning sign also have the following shortcomings. Most of the conventional light reflecting triangular warning sign is not easy to store because of their sizes. Although the size of the conventional light reflecting triangular warning sign seem too large to fit well in the trunk of the vehicle, when they are placed on the road, they becomes too small to catch the attention of other drivers. The earlier the other drivers can detect the bad road condition ahead, the more reaction time the other drivers may have to avoid the accident.

Another major disadvantage of the conventional light reflecting triangular warning sign is that it do not provide the self-flashing or self-illuminating function. As mentioned above, during low visibility condition, such as the bad weather condition or nighttime, other drivers may not be able to clearly observe the warning signs that would lead to an undesirable accident.

SUMMARY OF THE PRESENT INVENTION

The main objective of the present invention is to provide an illuminant triangular warning arrangement, which not only provides a light reflector device, but also comprises a plurality of build-in self-flashing illuminating units to alert other drivers in high visibility, during either day time or night time, to provide safety protection for the drivers and the troubled vehicle. Moreover, the illuminating units are specifically designed to bring instant attention from other drivers on the road form far away.

Another objective of the present invention is to provide an illuminant triangular warning arrangement, which has an easy and convenient installation process that it can be assembled in matter of seconds. When the illuminant triangular warning arrangement is in used, its displaying area is large enough to attract other distance drivers attention. When it is not in used, it can be folded into a compact package, so that it would not occupy unnecessary space in the trunk of the vehicle for easy storage.

According to the present invention, an illuminant triangular warning arrangement comprises a triangular clothe body and an illuminant device. The illuminant device comprises a battery box, a manual switch and a plurality of illuminating units provided on the triangular clothe body, in which each illuminating unit comprises a circuit board, a casing socket, a fitting washer, and a photodiode (LED). The present invention not only can provide the light reflecting function as in the conventional warning sigh, but also can provide flashing light, especially during low visibility condition in bad weather or nighttime, so that the driver and the troubled vehicle can be easily observed by the other drivers on the road.

BRIEF DESCRIPTION OF THE DRAWINGS

FIG. 5A is an exploded view of the illuminating unit, according to the above preferred embodiment of the present invention.

FIG. 5B is a rear view of a circuit board according to the above preferred embodiment of the present invention.

DETAILED DESCRIPTION OF THE PREFERRED EMBODIMENT

Figure 1:
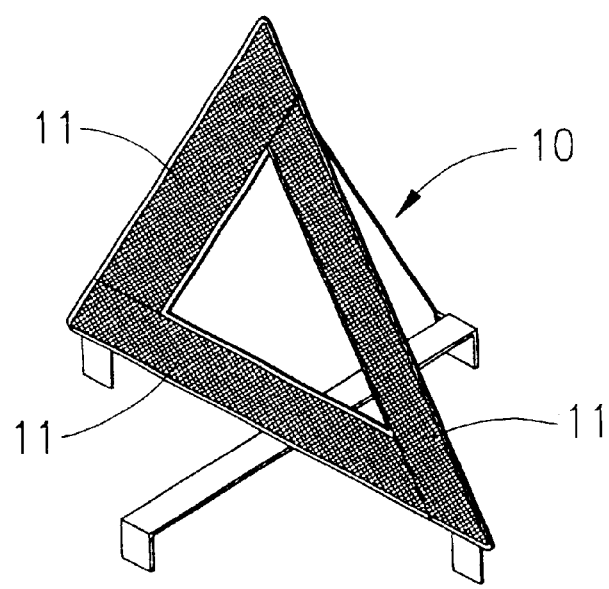
FIG. 1 is a perspective view of the conventional triangular warning sign frame.
Figure 2:
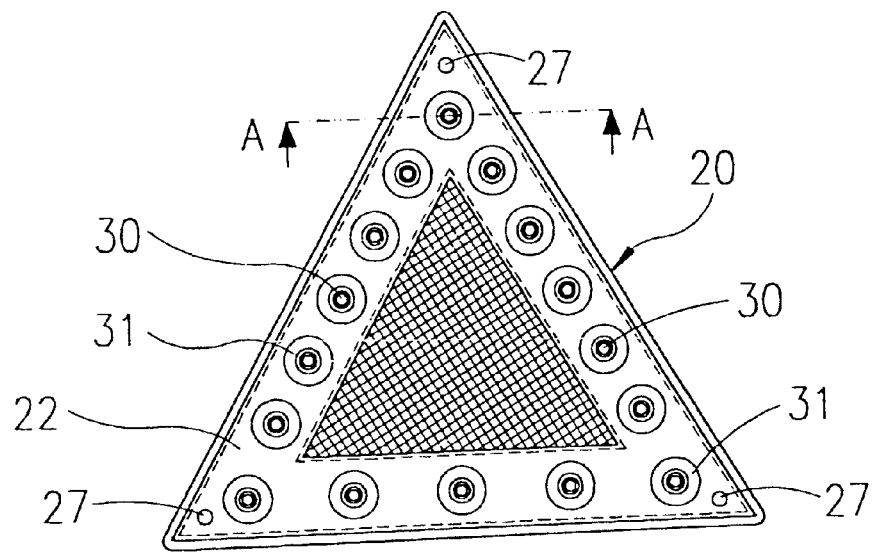
FIG. 2 is a top view of an illuminant triangular warning arrangement according to a preferred embodiment of the present invention.
Figure 3:
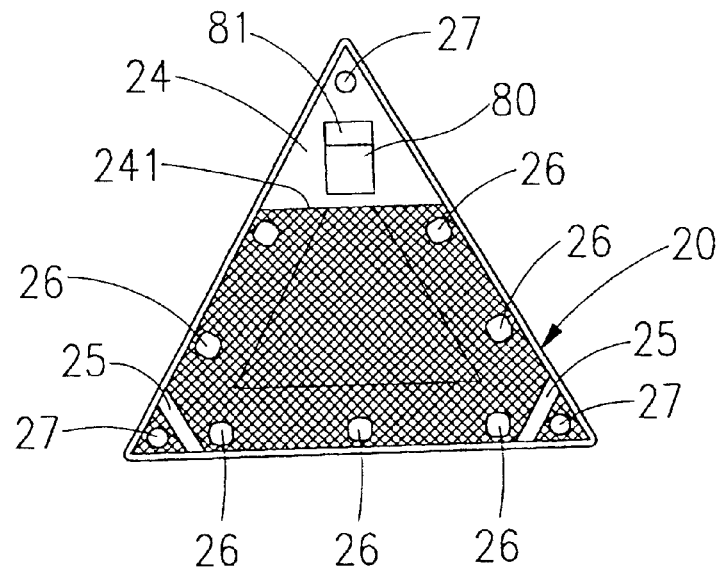
FIG. 3 is a bottom view of an illuminant triangular warning arrangement according to a preferred embodiment of the present invention.

Referring to FIGS. 1 to 7 of the drawing, an illuminant triangular warning arrangement according to a preferred embodiment of the present invention is illustrated. The illuminant triangular warning arrangement comprises a triangular clothe body 20 and a plurality of illuminating units 30 installed on the triangular clothe body 20, wherein said triangular clothe body 20 comprises a triangular bottom clothe layer 21 and a triangular reflecting layer 22 which are made of a kind of polymeric material such as polyethylene (PVC).

Figure 4:
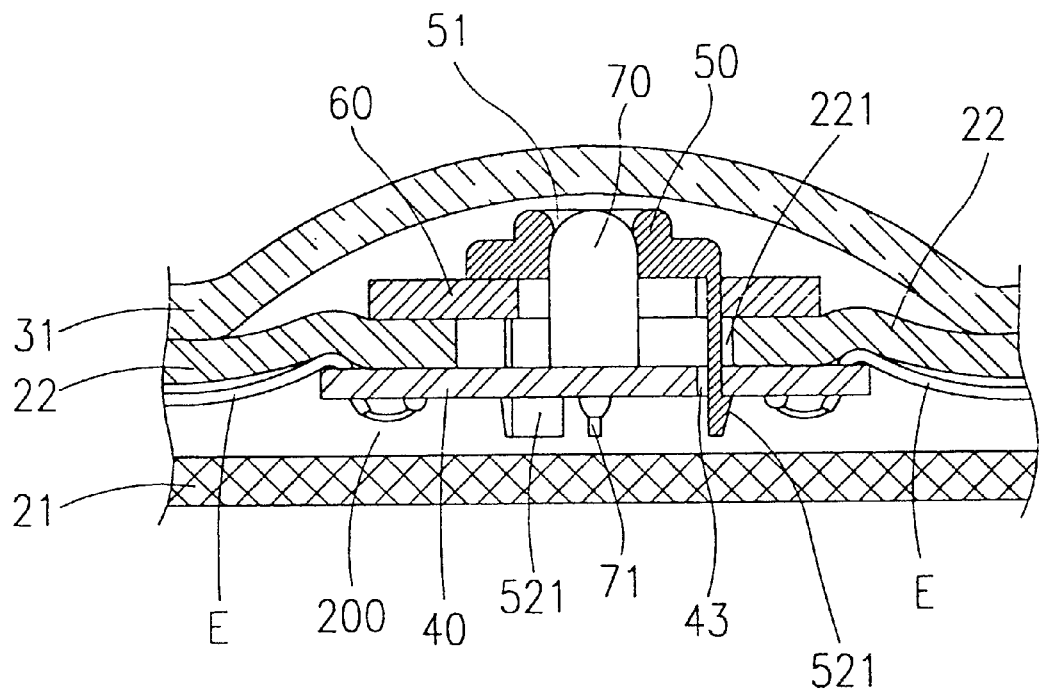
FIG. 4 is a sectional end view of the illuminating unit, along section line A—A of FIG. 2, according to the above preferred embodiment of the present invention.

A peripheral edge of said triangular reflecting layer 22 is sealedly connected to a peripheral edge of the bottom clothe layer 21 in a water tight manner, so as to define a hollow pocket 200 between said triangular reflecting layer 22 and said bottom clothe 21 (as shown in FIG. 4). The triangular reflecting layer 22 has a plurality of through holes 221 arranged evenly and spacedly thereon. The rear of triangular bottom clothe body 20 also has a suspension pocket 24 which located on the one of corner of said triangular bottom clothe layer 21, and the other of corner being attached on an elastic webbing 25 respectively of said rear of triangular clothe layer 21, wherein said suspension pocket 24 also has a bottom opening 241 to wearing on the top corner of reflecting plate 11 of triangular warning sign frame 10.

The suspension pocket 24 has a battery container 80 affixed thereon for receiving a battery box 90, wherein said battery container 80 has an opening 801 and a male loop and hoop fastener 802 positioned near said opening 801, moreover said suspension pocket 24 further provides a cover 81 near said opening 801 of said battery container 80, said cover 81 having an outer edge affixed on said suspension pocket 24 and a free end 811 of covering said opening 801 of said battery container 80, said free end 811 having a female loop and hoop fastener 812 provided at a location with respect to said male loop and hoop fastener 802 of said battery container 80 for fastening said cover 81 to said battery container 80.

The peripheral edge of the triangular bottom clothe layer 21, attaches a plurality of magnetic elements 26 and has a plurality of affixing holes 27, in which the magnetic elements 26 are adapted for attaching the triangular bottom clothe layer 21 of the triangular clothe body 20 to a metallic surface for spreading out the clothe body 20. A plurality of suckers are firmly mounted on the affixing holed 27 respectively, for attaching the triangular bottom clothe layer 21 of the triangular clothe body 20 to a nonmetallic surface while spreading out the triangular clothe body 20.

Referring to FIGS. 4, 5A, and 5B, a plurality of illuminating units 30 which are installed on said triangular clothe body 20 and are electrically interconnected by electrical wires E, are positional within said hollow pocket 200 between said triangular reflecting layer 22 and said triangular bottom clothe layer 21 and installed respectively at said respective through holes 221 along said triangular reflecting layer 22, where in each of said illuminating unit comprises a transparent layer 31 having a peripheral edge affixed to a rim of said respective through hole 221 of the triangular reflecting layer 22, a circuit board 40 is positioned between the triangular bottom clothe layer 21 and the triangular reflecting layer 22, wherein two pairs of wire holes 41 are formed on two ends of said circuit board 40 is positioned between the triangular bottom clothe layer 21 and the triangular reflecting layer 22, wherein two pairs of wire holes 41 are formed on two ends of said circuit board 40 for said electrical wires E to respectively pass there through and to electrical weld to two electrical conducting regions 401 provided on two sides of said circuit board 40, said circuit board 40 further provided a plurality of welding holes 42 at a center portion for allowing a terminal end 71 of the photodiode 70 insert therein and weld on the electrical conducting regions 401 of said circuit board 40, and a plurality of affixing holes 43 surrounding the plurality of welding holes 42 for the clip end portion 521 of the affixing clips 52 of the casing socket 50 to engage therein.

A casing socket 50 is connected to the circuit board 40 by engaging the clip end portion 521 of said affixing clip 52 within said affixing holes 43 of said circuit board 40 through at least a fitting washer 60 and the through hole 221 of said triangular reflecting layer 22, therefore, the fitting washer 60 and the casing socket are pressed against said top surface of said triangular reflecting layer 22, a photodiode (LED) 70 being inserted into said center hole 51 of said casing socket 50, two terminal ends of said photodiode (LED) 70 being inserted into said welding hole 42 of said circuit board 40 and connected to said two conducting region 401 of said circuit board 40 respectively. A first end of each wire E is electrically connected to other illuminating units 30 and also to the battery box 90, so that it can be turned on and off by a manual switch 91.

Figure 6:
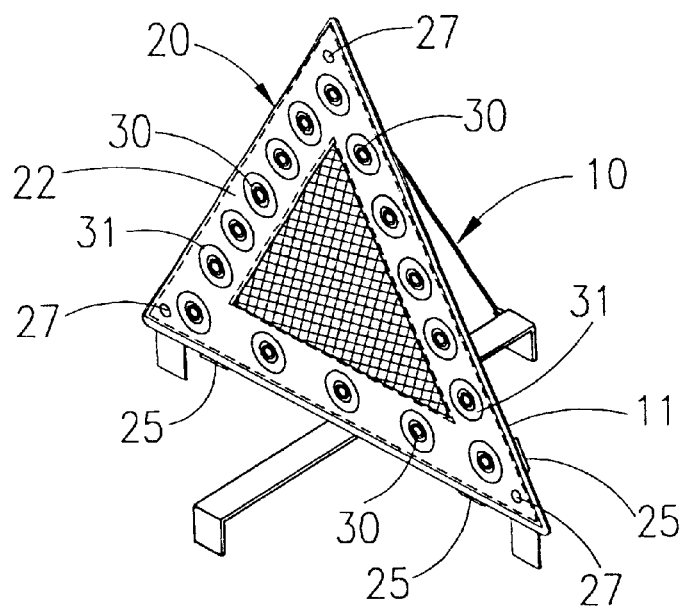
FIG. 6 is a front of perspective view of an illuminant triangular warning arrangement according to the above preferred embodiment of the present invention showing wore on the conventional triangular warning sign frame.
Figure 7:
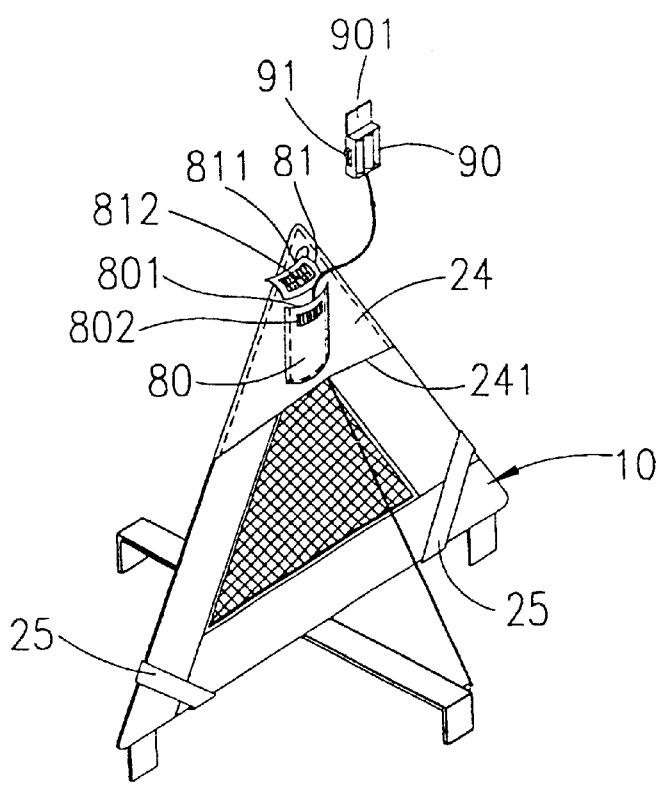
FIG. 7 is a back of perspective view of an illuminant triangular warning arrangement according to the above preferred embodiment of the present invention showing wore on the conventional triangular warning sign frame.
Figure 8:
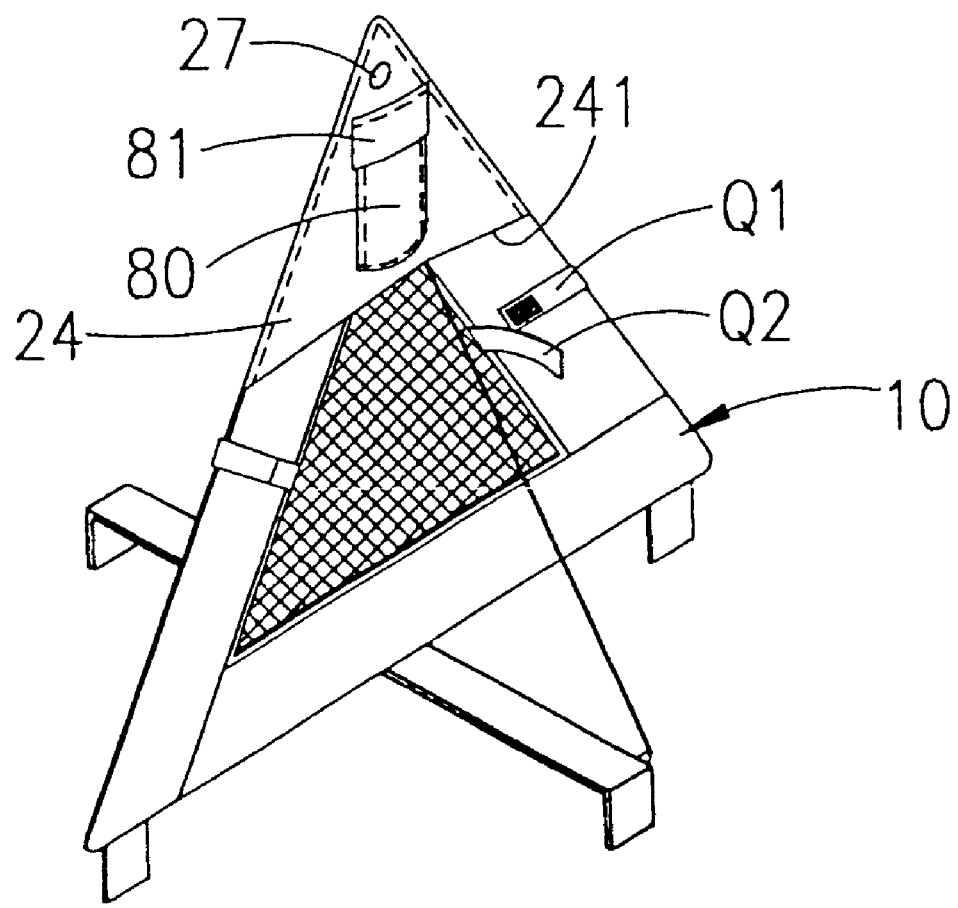
FIG. 8 is a back of perspective view of an illuminant triangular warning arrangement according to the above preferred embodiment of the present invention showing a pair of loop tape and hoop tape which fastened the triangular warning sign frame.

As shown in FIGS. 6 and 8, the battery box 90, which has at least a battery installed therein, provides a pull out handle 901 which has an end disposed out side of the opening 801 of the battery container 80, so that the user easily and conveniently take out the battery box 90 from the battery container 80 to exchange the battery. The manual switch 91 mounted in the battery box 90 for switching on or off the illuminant triangular warning arrangement of the present invention, moreover said bottom clothe layer 21 further provides a pair of hoop tape Q1 and loop tape Q2 on the rear of triangular clothe layer 21, that it can fastened the triangular warning sign frame 10 (as shown in FIG. 8).

Accordingly, when the illuminant triangular warning arrangement of the present invention is spread and wore on the triangular warning sign frame 10 to a ready to use position, by pressing the button 91 of manual switch 90 can activate the power source from the battery box 90 through the wires E to the circuit boards 40 to the photodiodes 70, so that the photodiodes 70 can flash and be observed through the transparent layer 31. According to the special arrangement provided on the warning arrangement, a warning effect to the other drivers on the road is thus provided.

What is claimed is:

1. An illuminant triangular warning arrangement, comprising:

a triangular clothe body comprising a triangular bottom clothe layer and a triangular reflecting layer, wherein a peripheral edge of said triangular reflecting layer is sealedly connected to a peripheral edge of the bottom clothe layer in a water tight manner, so as to define a hollow pocket between said triangular reflecting layer and said bottom clothe, wherein triangular reflecting layer has a plurality of through holes arranged evenly and spacedly thereon, the rear of triangular bottom clothe body also has a suspension pocket which located on the one of corner of said triangular bottom clothe layer, and the other of corner being attached on an elastic webbing respectively of said rear of triangular clothe layer, wherein said suspension pocket also has a bottom opening to wearing on the top corner of reflecting plate of triangular warning sign frame, the suspension pocket has a battery container affixed thereon for receiving a battery box, wherein said battery container has an opening and a male loop and hoop fastener positioned near said opening, moreover said suspension pocket further provides a cover near said opening of said battery container, said cover having an outer edge affixed on said suspension pocket and a free end of covering said opening of said battery container, said free end having a female loop and hoop fastener provided at a location with respect to said male loop and hoop fastener of said battery container for fastening said cover to said battery container, a plurality of illuminating units which are installed on said triangular clothe body and are electrically interconnected by electrical wires, are positional within said hollow pocket between said triangular reflecting layer and said triangular bottom clothe layer and installed respectively at said respective through holes along said triangular reflecting layer, where in each of said illuminating unit comprises:

a transparent layer having a peripheral edge affixed to a rim of said respective through hole of the triangular reflecting layer, a circuit board is positioned between the triangular bottom clothe layer and the triangular reflecting layer, wherein two pairs of wire holes are formed on two ends of said circuit board is positioned between the triangular bottom clothe layer and the triangular reflecting layer, wherein two pairs of wire holes are formed on two ends of said circuit board for said electrical wires to respectively pass there through and to electrical weld to two electrical conducting regions provided on two sides of said circuit board, said circuit board further provided a plurality of welding holes at a center portion for allowing a terminal end of the photodiode insert therein and weld on the electrical conducting regions of said circuit board, and a plurality of affixing holes surrounding the plurality of welding holes for the clip end portion of the affixing clips of the casing socket to engage therein, a casing socket is connected to the circuit board by engaging the clip end portion of said affixing clip within said affixing holes of said circuit board through at least a fitting washer and the through hole of said triangular reflecting layer, therefore, the fitting washer and the casing socket are pressed against said top surface of said triangular reflecting layer, a photodiode (LED) being inserted into said center hole of said casing socket, two terminal ends of said photodiode (LED) being inserted into said welding hole of said circuit board and connected to said two conducting region of said circuit board respectively, a first end of each wire is electrically connected to other illuminating units and also to the battery box, so that it can be turned on and off by a manual switch, a manual switch mounted in the battery box for switching said battery box on and off.

2. An illuminant triangular warning arrangement, as recited in claim 1, wherein said triangular bottom clothe layer and said triangular reflecting layer are made of PVC material.

3. An illuminant triangular warning arrangement, as recited in claim 2, wherein at said peripheral edge of said triangular bottom clothe layer, a plurality of affixing holes are provided for a plurality of suckers to insert therethrough for attaching said triangular bottom clothe layer of said triangular clothe body to a nonmetallic material when in used.

4. An illuminant triangular warning arrangement, as recited in claim 2, wherein at said peripheral edge of said triangular bottom clothe layer, a plurality of magnetic elements are affixed thereon for attaching said triangular bottom clothe layer of said triangular clothe body a metallic surface.

5. An illuminant triangular warning arrangement, as recited in claim 3, wherein at said peripheral edge of said triangular bottom clothe layer, a plurality of magnetic elements are affixed thereon for attaching said triangular bottom clothe layer of said triangular clothe body to a metallic surface.

6. An illuminant triangular warning arrangement, as recited in claim 4, wherein said battery box provides a pull out handle which has end disposed outside opening of said battery container.

* * * * *